US009407493B2

(12) United States Patent
Sarikaya (10) Patent No.: US 9,407,493 B2
(45) Date of Patent: Aug. 2, 2016

(54) SYSTEM AND APPARATUS FOR ROUTER ADVERTISEMENT OPTIONS FOR CONFIGURING NETWORKS TO SUPPORT MULTI-HOMED NEXT HOP ROUTES (71) Applicant: Futurewei Technologies, Inc., Plano, TX (US)

(72) Inventor: Behcet Sarikaya, Wylie, TX (US)

(73) Assignee: Futurewei Technologies, Inc., Plano, TX (US)

(\*) Notice: Subject to any disclaimer, the term of this patent is extended or adjusted under 35 U.S.C. 154(b) by 582 days.

(21) Appl. No.: 13/866,832

(22) Filed: Apr. 19, 2013

(65) Prior Publication Data
US 2013/0279367 A1    Oct. 24, 2013

Related U.S. Application Data (60) Provisional application No. 61/635,736, filed on Apr. 19, 2012.

(51) Int. Cl.
*H04L 12/28* (2006.01)
*H04L 29/06* (2006.01)
*H04L 12/56* (2006.01)
*H04L 12/721* (2013.01)

(52) U.S. Cl.
CPC .......... *H04L 29/06068* (2013.01); *H04L 45/72* (2013.01); *H04L 45/741* (2013.01)

(58) Field of Classification Search
CPC .. H04L 29/06068; H04L 45/741; H04L 45/72
USPC ........... 370/221–225, 254–310; 709/226–242
See application file for complete search history.

(56) References Cited

U.S. PATENT DOCUMENTS

| 6,038,233 | A | 3/2000 | Hamamoto et al. |
| 6,708,219 | B1 | 3/2004 | Borella et al. |
| 7,263,075 | B2* | 8/2007 | Roh ...................... H04W 40/00 370/310 |
| 7,542,458 | B2* | 6/2009 | Lioy ....................... H04L 29/06 370/349 |
| 7,577,141 | B2 | 8/2009 | Kamata et al. |
| 7,860,094 | B2 | 12/2010 | Tsuchiya et al. |
| 7,876,757 | B2* | 1/2011 | Jain ......................... H04L 45/00 370/392 |
| 7,894,433 | B2* | 2/2011 | Ribiere ............... H04L 12/5692 370/329 |
| 7,894,456 | B2* | 2/2011 | Koskelainen ........... H04L 45/00 370/252 |

(Continued)

OTHER PUBLICATIONS

Baker, F. J., "IPv6 Source/Destination Routing Using IS-IS," Network Working Group, Internet Draft, draft-baker-ipv6-isis-dst-src-routing-00, Feb. 17, 2013 11 pages.

(Continued)

*Primary Examiner* — Man Phan
(74) *Attorney, Agent, or Firm* — Conley Rose, P.C.; Grant Rodolph; William H. Dietrich (57) ABSTRACT A network element (NE) comprising a processor configured to receive a Router Solicitation (RS) from a multi-homed host interested in obtaining routing information, and in response to the RS, send the route information to the multi-homed host in a Router Advertisement (RA) message, wherein the route information comprises source address information for the multi-homed host. Also disclosed is a NE comprising a processor configured to receive a RS from a multi-homed host interested in obtaining routing information, and in response to the RS, send the route information to the multi-homed host in a RA message, wherein the route information comprises next hop information for the multi-homed host.

19 Claims, 5 Drawing Sheets

(56) References Cited

U.S. PATENT DOCUMENTS

| | | | |
|---|---|---|---|
| 8,054,839 B2* | 11/2011 | Cha | H04L 29/1232 370/254 |
| 8,254,294 B2* | 8/2012 | Vesterinen | H04W 76/022 370/259 |
| 8,539,053 B2* | 9/2013 | Sarikaya | H04L 61/2015 709/221 |
| 8,665,873 B2 | 3/2014 | Sarikaya et al. | |
| 8,879,418 B2* | 11/2014 | Yan | H04L 29/12066 370/254 |
| 9,036,633 B2 | 5/2015 | Sarikaya | |
| 2007/0008949 A1* | 1/2007 | Balandin | H04L 45/02 370/351 |
| 2011/0286470 A1 | 11/2011 | Dec et al. | |
| 2012/0005299 A1 | 1/2012 | Xu | |
| 2012/0005372 A1 | 1/2012 | Sarikaya et al. | |
| 2012/0163164 A1* | 6/2012 | Terry | H04L 45/24 370/221 |
| 2013/0007291 A1 | 1/2013 | Nickols | |
| 2014/0376470 A1 | 12/2014 | Mahkonen et al. | |
| 2015/0222567 A1 | 8/2015 | Sarikaya | |

OTHER PUBLICATIONS

Baker, F. J., "IPv6 Source/Destination Routing Using OSPFv3," Network Working Group, Internet Draft, draft-baker-ipv6-ospf-dst-src-routing-00, Feb. 17, 2013, 10 pages.

Boucadair, M., Ed., et al., "IPv6 Multicast Address With Embedded IPv4 Multicast Address," MBONED Working Group, Internet Draft, draft-ietf-mboned-64-multicast-address-format-04, Aug. 24, 2012, 14 pages.

Jiang, S., Ed., et al., "IPv4 Residual Deployment via IPv6—a Stateless Solution (4rd)," Internet Engineering Task Force, Internet Draft, draft-ietf-softwire-4rd-04, Oct. 22, 2012, 40 pages.

Troan, O., et al., "Mapping of Address and Port with Encapsulation (MAP)," Network Working Group, Internet Draft, draft-ietf-softwire-map-05, Mar. 18, 2013, 53 pages.

Li, X., et al., "Mapping of Address and Port Using Translation (MAP-T)," Network Working Group, Internet Draft, draft-ietf-softwire-map-t-01, Feb. 18, 2013, 33 pages.

Boucadair, M., et al., "DHCPv6 Option for IPv4-Embedded Multicast and Unicast IPv6 Prefixes," Softwire WG, Internet Draft, draft-ietf-softwire-multicast-prefix-option-00, Mar. 28, 2012, 9 pages.

Boucadair, M., et al., "DHCPv6 Option for IPv4-Embedded Multicast and Unicast IPv6 Prefixes," Softwire WG, Internet Draft, draft-ietf-softwire-multicast-prefix-option-03, Oct. 22, 2012, 9 pages.

Sarikaya, B., "IPv6 RA Options for Multiple Interface Next Hop Routes," Network Working Group, Internet Draft, draft-sarikaya-mif-6man-ra-route-03, Mar. 27, 2013, 13 pages.

Sarikaya, B., "IPv6 RA Options for Translation Multicast Prefixes," Network Working Group, Internet Draft, draft-sarikaya-softwire-6man-raoptions4mcast-02, Mar. 27, 2013, 13 pages.

Bradner, S., "Key Words for Use in RFCs to Indicate Requirement Levels," Network Working Group, RFC 2119, Mar. 1997, 3 pages.

Rose, M., "Writing I-Ds and RFCs Using XML," Network Working Group, RFC 2629, Jun. 1999, 32 pages.

Ferguson, P., et al., "Network Ingress Filtering: Defeating Denial of Service Attacks Which Employ IP Source Address Spoofing," Network Working Group, RFC 2827, May 2000, 10 pages.

Haberman, B., et al., "Unicast-Prefix-Based IPv6 Multicast Addresses," Network Working Group, RFC 3306, Aug. 2002, 8 pages.

Cain, B., et al., "Internet Group Management Protocol, Version 3," Network Working Group, RFC 3376, Oct. 2002, 54 pages.

Vida, R., Ed., et al., "Multicast Listener Discovery Version 2 (MLDv2) for IPv6," Network Working Group, RFC 3810, Jun. 2004, 63 pages.

Arkko, J., Ed., "SEcure Neighbor Discovery (SEND)," Network Working Group, RFC 3971, Mar. 2005, 53 pages.

Draves, R., et al., "Default Router Preferences and More-Specific Routes," Network Working Group, RFC 4191, Nov. 2005, 16 pages.

Fenner, B., et al., Internet Group Management Protocol (IGMP)/Multicast Listener Discovery (MLD)—Based Multicast Forwarding ("IGMP/MLD Proxying"), Network Working Group, RFC 4605, Aug. 2006, 13 pages.

Narten, T., et al., "Neighbor Discovery for IP version 6 (IPv6)," Network Working Group, RFC 4861, Sep. 2007, 98 pages.

Thomson, S., et al., "IPv6 Stateless Address Autoconfiguration," Network Working Group, RFC 4862, Sep. 2007, 31 pages.

Coltun, R., et al., "OSPF for IPv6," Network Working Group, RFC 5340, Jul. 2008, 95 pages.

Bao, C., et al., "IPv6 Addressing of IPv4/IPv6 Translators," Internet Engineering Task Force (IETF), RFC 6052, Oct. 2010, 19 pages.

Jeong, J., et al., "IPv6 Router Advertisement Options for DNS Configuration," Internet Engineering Task Force (IETF), RFC 6106, Nov. 2010, 20 pages.

Li, X., et al., "IP/ICMP Translation Algorithm," Internet Engineering Task Force (IETF), RFC 6145, Apr. 2011, 34 pages.

Arkko, J., et al., "Guidelines for Using IPv6 Transition Mechanisms During IPv6 Deployment," Internet Engineering Task Force (IETF), RFC 6180, May 2011, 21 pages.

Durand, A., et al., "Dual-Stack Lite Broadband Deployments Following IPv4 Exhaustion," Internet Engineering Task Force (IETF), RFC 6333, Aug. 2011, 33 pages.

"Information Technology—Telecommunications and Information Exchange Between Systems—Intermediate System to Intermediate System Intra-Domain Routing Information Exchange Protocol for Use in Conjunction with the Protocol for Providing the Connectionless-Mode Network Service (ISO 8473)," International Organization for Standardization, International Standard, ISO/IEC 10589, First Edition: Apr. 30, 1992, 155 pages.

Office Action dated Dec. 2, 2015, 16 pages, U.S. Appl. No. 13/866,867, filed Apr. 19, 2013.

* cited by examiner

SYSTEM AND APPARATUS FOR ROUTER ADVERTISEMENT OPTIONS FOR CONFIGURING NETWORKS TO SUPPORT MULTI-HOMED NEXT HOP ROUTES

CROSS-REFERENCE TO RELATED APPLICATIONS

The present application claims priority to U.S. Provisional Patent Application 61/635,736, filed Apr. 19, 2012 by Behcet Sarikaya, and entitled "IPv6 RA Options for Translation Multicast Prefixes and Multiple Interface Next Hop Routes," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network elements (NE) may function as nodes in a network. Such nodes may be configured to communicate data between various points in the network. Networks may be interconnected to other networks to allow NEs to communicate on a global scale, for example via the Internet. NEs may require information to perform routing tasks over varied and complex networks. Information related to network routing may be delivered to a requesting NE in a variety of ways. The types of networks involved and the technologies associated with such networks may determine the limits of what information is available to a particular NE, and how such available information is transmitted to the NE.

SUMMARY

In one embodiment, the disclosure includes a NE comprising a processor configured to receive a Router Solicitation (RS) from a multi-homed host interested in obtaining routing information, and in response to the RS, send the route information to the multi-homed host in a Router Advertisement (RA) message, wherein the route information comprises source address information for the multi-homed host.

In another embodiment, the disclosure includes a NE comprising a processor configured to receive a RS from a multi-homed host interested in obtaining routing information, and in response to the RS, send the route information to the multi-homed host in a RA message, wherein the route information comprises next hop information for the multi-homed host.

In another embodiment, the disclosure includes a method comprising configuring a multi-homed host with at least one source address by transmitting a RA message comprising the source address to the multi-homed host, and performing source address filtering on messages received from the multi-homed host, wherein source address filtering comprises dropping messages received from the multi-homed host that do not comprise the source address.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Internet Protocol version Six (IPv6) Neighbor Discovery and IPv6 Stateless Address Autoconfiguration protocols may be used to configure fixed and mobile nodes with various parameters related to addressing and routing. Domain Name System (DNS) Recursive Server Addresses and Domain Name Search Lists are additional parameters that can be configured using RAs. Next hop addresses and related route information may be provided by mechanisms such as directly by the next hop routers. However, next hop routers may be unable to provide this information in some cases. One solution would be to develop an inter-router protocol to instigate the next hop routers to provide this information. However, such a solution may not be practical due to the complexities involved.

Disclosed herein is a system and/or method to extend RA related protocols to configure system parameters. In one embodiment, a multi-homed host may be simultaneously connected to a plurality of access networks. The access networks may be of the same or differing technologies, for example a 3rd generation of mobile telecommunications technology (3G) network and a Institute of Electrical and Electronics Engineers (IEEE) 802.11 (Wifi) network. An ingress router for a first access network may transmit a RA to the multi-homed host. The RA may comprise a source address, which may be used by the host for all future transmissions to the first access network. The source address may then be used by the ingress router to filter out all packets from the multi-homed host not intended for the first access network (e.g. intended for a second access network). The RA may further comprise one or more route prefixes as well as associated next hop addresses and/or preference metrics. The route prefixes and/or the next hop addresses may allow the host to determine routes to the access network and whether any route should be preferred over other routes. An associated RA Source Address option, Route Prefix option, and Next Hop Address option are discussed in Internet Engineering Task Force (IETF) document draft-sarikaya-mif-6man-ra-route-03, which is incorporated by reference as if reproduced in its entirety.

Figure 1:
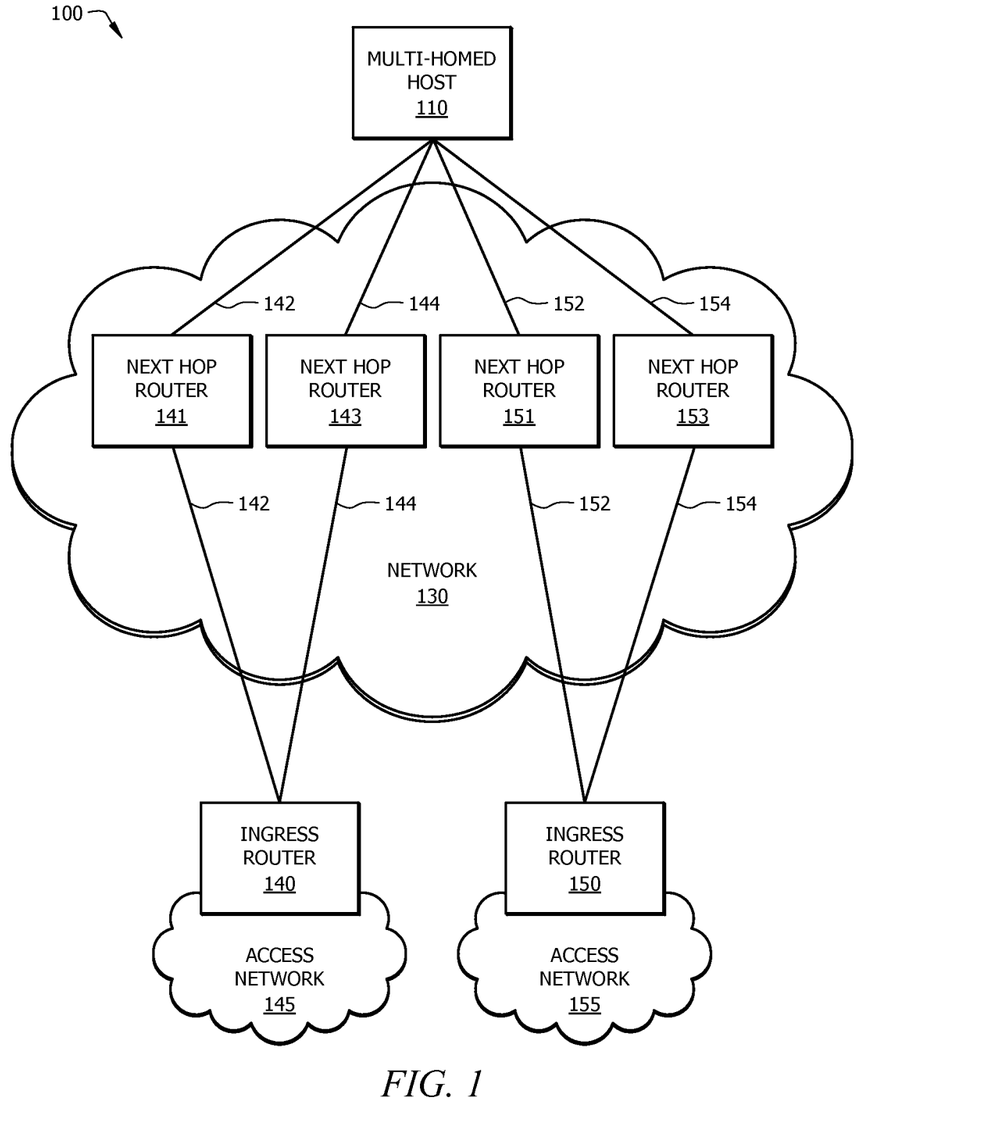
FIG. 1 is a schematic diagram of an embodiment of a network architecture for supporting connectivity of a multi-homed host.

FIG. 1 is a schematic diagram of an embodiment of a network architecture 100 for supporting connectivity of a multi-homed host 110. Network 100 may comprise the multi-homed host 110 that may connected to access network 145 and access network 155 via ingress router 140 and ingress router 150, respectively. The multi-home host 110 may access ingress router 140 via a plurality of routes 142 and 144, which may each comprise a plurality of nodes including next hop router 141 and next hop router 143, respectively. The multi-home host 110 may also access ingress router 150 via a plurality of routes 152 and 154, which may each comprise a plurality of nodes including next hop router 151 and next hop router 153, respectively. Host 110 may transmit a router solicitation to ingress router 140 and/or 150. Ingress routers 140 and/or 150 may each respond with RA message. The RA message from ingress router 140 may comprise a source address for use by the host when communicating with access network 145, route prefixes associated with access network 145, respectively, Internet Protocol (IP) addresses associated with next hop router 141 and 143, respectively, or combinations thereof. The RA message from ingress router 150 may comprise a source address for use by the host when communicating with access network 155, route prefixes associated with access network 155, respectively, IP addresses associated with next hop router 151 and 153, respectively, or combinations thereof. The host 110 may then transmit packets to access network 145 and/or access network 155 by employing the appropriate source address, route prefix, and/or next hop address.

A multi-homed host 110 may be any NE (e.g. client device) configured to connect to two different access networks (e.g. access network 145 and 155, respectively) and/or a single access network via a plurality of links at substantially the same time. Multihoming may be used to increase the reliability of a host 110 and/or client network associated with a host 110. Multihoming may generally comprise employing a single upstream and/or downstream link with multiple source addresses associated with the host 110, employing multiple host 110 interfaces and a single host 110 source address, employing multiple links with a single host 110 source address, and/or employing multiple links with multiple host 110 source addresses. For example, a host 110 may be a smart phone configured to connect to a first access network 145 over a Wifi interface and second access network 155 over a 3G interface. As another example, host 110 may be a corporate server configured to communicate with multiple internet service providers (ISPs) by obtaining a different source address from each ISP. Multihoming may primarily be employed by IPv6 hosts. Multi-homed host 110 may comprise a routing table which may be configured with route information. The route information of the routing table may be employed to route communications from the host 110 to the access network 145 and/or 155 via network 130. Host 110 may also be assigned at least one source address. For example, host 110 may be assigned a first source address for communications sent to access network 145 and a second source address for communications sent to access network 145. The source address(es) may also be considered routing information and may or may not be stored in the routing table.

Network 130 may be any network of NEs positioned between a host 110 and access networks 145 and 155 (e.g. the Internet). Network 130 may comprise various components to receive wireless and/or wired communications from host 110 and route such communications toward the access networks 145 and/or 155. For example, network 130 may comprise wireless receivers, base stations, routers, switches, and/or any other components needed to support host 110 communications. Network 130 may comprise at least one next hop router, for example next hop routers 141, 143, 151, and 153. Host 110 may connect to access networks 145 and/or 155 via routes 142, 144, 152, and/or 154, which may pass through next hop routers 141, 143, 151, and/or 153, respectively. A next hop router (e.g. next hop router 141, 143, 151, and/or 153) may be any router that is one hop away from a host (e.g. host 110) along a route (e.g. routes 142, 144, 152, and/or 154). A hop may be a portion of a route (e.g. routes 142, 144, 152, and/or 154) positioned between two NEs, such as routers, switches, etc. Each access network 145 and/or 155 may be assigned a prefix and each next hop router 141, 143, 151, and/or 153 may be assigned an IP address. The route prefixes of access network 145 and/or 155 and next hop addresses of next hop routers 141, 143, 151, and/or 153 may be route information that may be transmitted to host 110 to allow host 110 to select an appropriate route 142, 144, 152, and/or 154 for a specified communication to access network 145 and/or 155.

An ingress router (e.g. ingress router 140 and/or 150) may be any NE positioned at the edge of an access network (e.g. access network 145 and/or 155, respectively). Each ingress router 140 and 150 may comprise a routing table and may be aware of routing information related to network 130 based on the information stored in the associated routing table. Such routing information may be received via various interior gateway protocols (IGPs), exterior gateway protocols (EGPs), border gateway protocols (BGPs), etc. An ingress router 140 and/or 150 may be responsible for configuring a host 110 with routing information which may be needed to communicate with an associated access network 145 and/or 155. For example, a multi-home host 110 may boot up and determine to connect to the Internet a virtual private network (VPN) or other services via access networks 145 and/or 155. The host 110 may send router solicitation(s) to ingress router 140 and/or ingress router 150. In response, the Ingress routers 140 and/or 150 may wish to reply to the host with source address information. Source address information may be a specific source address and/or a source prefix that may be used by the host to create a plurality of source addresses. Source address information may be considered a type of route information. For example, ingress router 140 may assign a first source address to host 110 and ingress router 150 may assign a second source address to host 110, respectively. As such, the first source address may be associated with network 145 and/or ingress router 140 and the second source address may be associated with network 155 and/or ingress router 150, respectively. Router 145 may respond to the router solicitation by transmitting a router advertisement to host 110. The router advertisement from router 145 may comprise the first source address, route prefixes for access network 145 and IP addresses for next hop routers 141 and/or 143 (e.g. next hop addresses). Also, router 155 may respond to the router solicitation by transmitting a router advertisement to host 110. The router advertisement from router 155 may comprise the second source address, route prefixes for access network 155 and IP addresses for next hop routers 141 and/or 143 (e.g. next hop addresses). The host 110 may use the route information to communicate with access networks 145 and/or 155. Packets destined for network 145 may comprise the first source address and packets destined for network 155 may comprise the second source address, respectively. Ingress routers 145 and/or 155 may receive packets destined for their respective networks 145 and/or 155 and perform source address filtering. For example, ingress router 140 may drop all packets received from host 110 that do not comprise the first source address and ingress router 150 may drop all packets from host 110 that do not comprise the second host address. Such source address filtering may ensure that only packets intended for a particular access network (e.g. access network 145 and/or 155) are actually forwarded to that access network.

As discussed above, RAs can also be used to configure fixed and mobile nodes (e.g. host 110) in multi-homed scenarios with route information (e.g. prefixes access networks 145 and 155) and next hop addresses (e.g. IP addresses for next hop routers 141, 143, 151, and/or 153). Different scenarios may exist such as the host 110 may be simultaneously connected to multiple access networks (e.g. access network 145 and/or 155) of differing technologies, such as WiFi and 3G. The node (e.g. host 110) may also be connected to more than one gateway (e.g. ingress routers 140 and/or 150). Such connectivity may be realized by maintaining dedicated physical and/or logical links (e.g. routes 142, 144, 152, and/or 154) that may also be shared with other user's nodes, for example in residential access networks.

A host, for example a mobile host 110 interested in obtaining routing information may send a RS message on a link. The router (e.g. ingress router 140 and/or 150), when configured to do so, may provide the route information using zero, one or more Next Hop Address and/or Route Information options in the RA messages sent in response.

The route options may be extensible, and/or may convey detailed information for the routes. An RS and RA exchange may be employed for next hop address and route information determination and may not be used for determining a link-layer address of the router (e.g. ingress router 140 and/or 150). Subsequent Neighbor Solicitation and Neighbor Advertisement exchanges may be used to determine link-layer address of the router. It should be noted that the proposed options may require a central site-wide configuration mechanism, as the values that may be required may not automatically be derived from routing tables.

Networks 145 and 155 may not comprise the same functionality in some cases. For example, a non-trustworthy network (e.g. access network 155) may be available at the same time as a trustworthy network (e.g. access network 145). As such, there may be a risk of negative consequences if the host 110 confuses the two networks. There may generally be two non-trustworthy network models for hosts with multiple interfaces, both of which may be valid, but which may be incompatible with each other. In the first model, an interface may be connected to a secure network, for example a corporate network (e.g. network 145), over a VPN. The secure VPN connection(s) may be trusted because such connection may have been authenticated. Routes obtained over such a secure connection (e.g. routes 142 and/or 144) may be trusted, and such routes may be preferred. In the secured connection case, the host 110 may also be connected to a network (e.g. 155) that may be offered as a default route (e.g. routes 152 and/or 154). Attempts to connect to resources on the enterprise network over the default route may be result in malicious attacks.

In the second non-trustworthy network model none of the networks to which the host 110 is connected may be meaningfully more or less trustworthy. In this scenario, the untrustworthy network(s) may transmit routes to other hosts (e.g. hosts positioned in the VPN, such as nodes in network 155), and such routes may pass through malicious nodes (e.g. positioned in network 130). Such routes may result in negative consequences because the host's 110 traffic, which may be intended for the corporate VPN, may be hijacked by the intermediate malicious nodes (e.g. as such traffic passes through network 130).

The router advertisement extensions described herein may be used to install the routes. The use of such a technique may be useful primarily in the former case above (e.g. the trusted network scenario). The host 110 may obtain an authenticated connection to the network to which it connects before establishing routes so that the router advertisements can be trusted.

Also as discussed above, in multi-homed networks, there may be a need to perform source address based routing if some providers wish to perform ingress filtering (e.g. at ingress routers 140 and/or 150). The routers (e.g. in networks 130 along routes 142, 144, 152, and/or 152, and/or in networks 145 and/or 155) may consider the source addresses of any packets received from the host 110 as well as the destination addresses in determining which next hop to send the packet to. The routers may be informed about the source addresses to use in routing using extensions to the routing protocols such as Intermediate System to Intermediate System (IS-IS) and Open Shortest Path First (OSPF). As discussed herein, the router advertisement extensions may be employed to further support source address dependent routing.

Routing protocol extensions for source address dependent routing may not avoid a host 110 that uses a source address that may be subject to ingress filtering (e.g. at ingress routers 140 and/or 150) when sending a packet to one of the next hops. In that case the host may receive an Internet Control Message Protocol (ICMP) source address failed ingress/egress policy error message (e.g. from ingress routers 140 and/or 150) in which case the host 110 may resend the packet trying a different source address. The RA extensions defined herein may avoid such inefficiency in packet forwarding at the host 110.

The RA options defined herein may be used by a Type C host (e.g. host 110), which may be any multi-homed host configured to employ a Routing Table instead of a Default Router List. The host 110 may set up a routing table based on the router advertisement extensions defined herein. The routes established (e.g. routes 142, 144, 152, and/or 154) may be used in forwarding packets to a next hop based on the destination prefix/address using a longest match algorithm. In case the host 110 receives a Next Hop Address with Source Address and Route Prefix option as discussed below, the host may employ a source and destination prefix and/or address using the longest match algorithm in order to select a next hop to forward a packet to.

The router (e.g. ingress router 140 and/or 150) may send one or more Next Hop Address options, as discussed below, that specify the IPv6 next hop addresses (e.g. of next hop routers 141, 143, 151, and/or 153). Each Next Hop Address option may be associated with zero, one, or more Route Prefix options that represent the IPv6 destination prefixes (e.g. associated with network 145 and/or network 155) reachable via a given next hop. An ingress router 140 and/or 150 may include Route Prefix option(s) in RA message to indicate that a given prefix is available directly on-link. A router (e.g. ingress router 140 and/or 150) may also send a single Next Hop Address without any Route Prefix options. When a router sends Next Hop Address option that is associated with Router Prefix option, the router may employ a Next Hop and Route Prefix option as defined below. The Route Prefix may contain a value of ::/0 with Prefix Length set to zero to indicate an available default route. The router may send one or more Next Hop Address options that may specify the IPv6 next hop addresses and source address. Each Next Hop Address option may be associated with zero, one, or more Source Address options that may represent the source addresses that are assigned from the prefixes that belong to the next hop. In addition, the option may contain Route Prefix options that may represent IPv6 destination prefixes reachable via the given next hop. A router may include a Source Address option and Route Prefix option in message to indicate that a given prefix is available directly on-link and that the source address may not be subject to ingress filtering.

It should be noted that Neighbor Discovery may be subject to attacks that cause IP packets to flow to unexpected places. As such, neighbor discovery messages may be secured, for example, by using Secure Neighbor Discovery (SEND) protocol.

Figure 2:
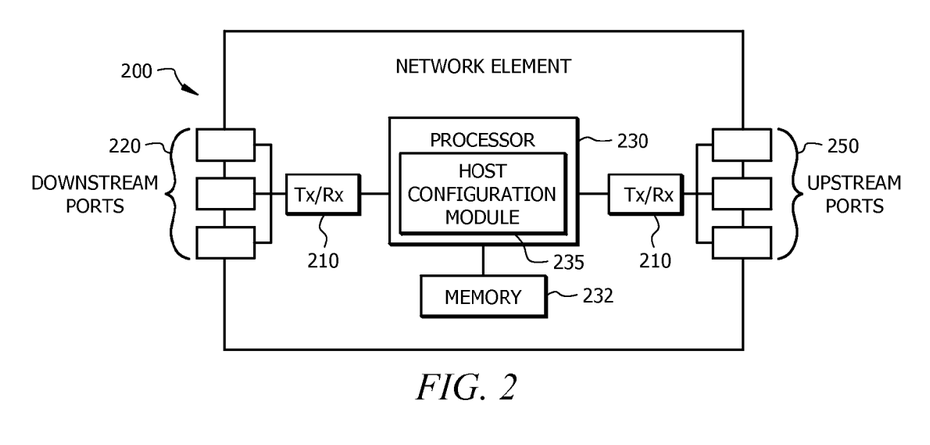
FIG. 2 is a schematic diagram of an embodiment of a NE within an ingress router.

FIG. 2 is a schematic diagram of an embodiment of a NE 200 within an ingress router (e.g. ingress router 140 and/or 150). In some embodiments NE 200 may also act as other node(s) in network 100. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure, for example configuration of a multi-homed host 110 with route information, may be implemented in a network apparatus or component such as an NE 200. For instance, the features/methods in the disclosure may be implemented using hardware, firmware, and/or software installed to run on hardware. The NE 200 may be any device that transports frames through a network, e.g., a switch, router, bridge, server, a client, etc. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 coupled to plurality of upstream ports 250 for transmitting and/or receiving frames from other nodes, respectively. A processor 230 may be coupled to the Tx/Rxs 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may also comprise a host configuration module 235, which may obtain host route information such as source address(es) route prefix(es) and/or next hop address(es) (e.g. from a routing table stored in memory) and transmit such route information to the host in an RA message. In the alternative, the host configuration module 235 may be implemented as instructions stored in memory 232, which may be executed by processor 230. The downstream ports 220 and/or upstream ports 250 may contain electrical and/or optical transmitting and/or receiving components. NE 200 may or may not be a routing component that makes routing decisions.

It is understood that by programming and/or loading executable instructions onto the NE 200, at least one of the processor 230, host configuration module 235, downstream ports 220, Tx/Rxs 210, memory 232, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
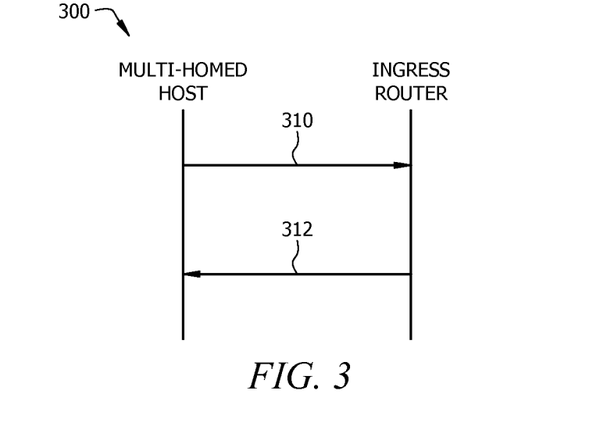
FIG. 3 is a protocol diagram of an embodiment of a method of configuring a multi-homed host.

FIG. 3 is a protocol diagram of an embodiment of a method 300 of configuring a multi-homed host, such as multi-homed host 110. Method 300 may be implemented by a host configuration module 235 via appropriate ports 220 and/or 250 as well as appropriate TxRxs 210. In method 300, a multi-home host may wish to obtain route information for subsequent communications. At step 310, the multi-homed host may transmit an RS message to an ingress router (e.g. ingress router 140, 150, and/or NE 200). The ingress router may receive the RS message, assign source address(es) to the host and obtain route prefixes and/or next hop addresses from a routing table. At step 312, the ingress router may transmit an RA message to the host (e.g. via network 130). The RA message may comprise the source address(es), route prefix(es), and/or next hop address(es). By using the RA message of step 312, the ingress router may configure the multi-homed host. Using the route information from the RA message of step 312, the multi-homed host may make routing decisions for security purposes and avoid inefficiencies that may be caused by the use of improper source addressing for source address filtering networks. The RA message of step 312 may be transmitted directly to the host (e.g. unicast) and/or flooded through the network (e.g. via an IGP protocol).

Figure 4:
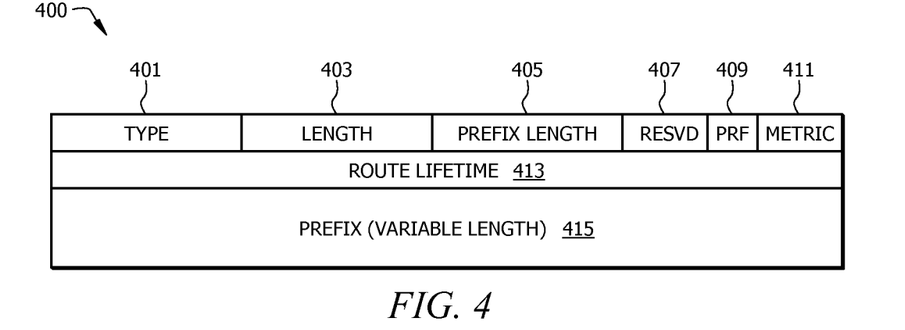
FIG. 4 is a schematic diagram of an embodiment of a Route Prefix option encoding.

FIG. 4 is a schematic diagram of an embodiment of a Route Prefix option 400 encoding. The Route Prefix option 400 may be sent by an ingress router (e.g. ingress router 140 and/or 150) as part of an RA message, as defined in IETF document Request For Comments (RFC) 4861, which is incorporated by reference. The Route Prefix option 400 may comprise route information such as a route prefix. The Route Prefix option 400 may comprise a type field 401, which may be eight bits in length, may extend from the zero bit position to the seventh bit position, and may be set to a value to indicate that the option is a Route Prefix option 400. The Route Prefix option 400 may further comprise a length field 403, which may be eight bits in length, may extend from the eighth bit position to the fifteenth bit position, and may be set to a value to indicate the length of the Route Prefix option 400 (e.g. including the type 401 and length 403 fields) in units of eight octets. The Route Prefix option 400 may further comprise a Prefix Length field 405, which may be eight bits in length, may extend from the sixteenth bit position to the twenty third bit position, and may be set to a value to indicate a number of leading bits in the prefix field 415 that comprise a prefix. The Route Prefix option 400 may further comprise a Reserved field 407, which may be three bits in length, may extend from the twenty fourth bit position to the twenty sixth bit position, and may be reserved for other purposes. The Route Prefix option 400 may further comprise a Default Router Preference (Prf) field 409, which may be two bits in length, may extend from the twenty seventh bit position to the twenty eighth bit position, and may be set to a value to indicate whether the host receiving the RA comprising the Route Prefix option 400 should prefer the NE sending the RA as a default router over other default routers. The Route Prefix option 400 may further comprise a Metric field 411, which may be three bits in length, may extend from the twenty ninth bit position to the thirty first bit position, and may be set to a value to indicate to the host whether to prefer the next hop associated with a prefix of prefix field 415 over other next hops when multiple identical prefixes (e.g. for different next hops) have been received by the host (e.g. in multiple RAs from multiple routers). The Route Prefix option 400 may further comprise a Route lifetime field 413, which may be thirty two bits in length, may extend from the zero bit position to the thirty first bit position, and may be set to a value to indicate a length of time in seconds that the IPv6 destination prefix or IPv6 destination address is valid for route determination. The Route Prefix option 400 may further comprise a Prefix field 415, which may be of variable length, may extend in successive thirty two bit sections, and may be set to a value to indicate an IPv6 destination prefix or IPv6 destination address reachable via a next hop node.

Figure 5:
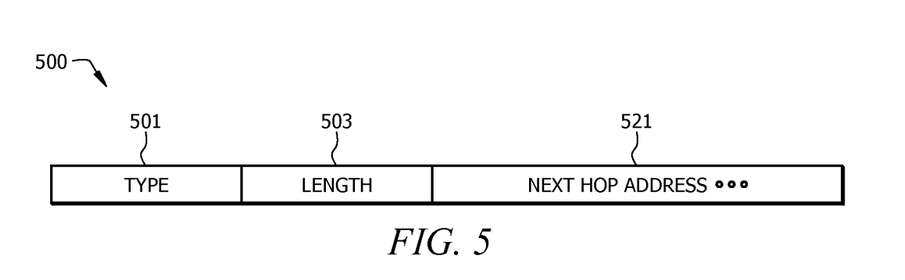
FIG. 5 is a schematic diagram of an embodiment of a Next Hop Address option encoding.

FIG. 5 is a schematic diagram of an embodiment of a Next Hop Address option 500 encoding. The Next Hop Address option 500 may be sent by an ingress router (e.g. ingress router 140 and/or 150) as part of an RA message and may comprise route information such as an IP address for a next hop router (e.g. next hop router 141, 143, 151, and/or 153). The Next Hop Address option 500 may comprise a type field 501 and a length field 503, which may be similar to type field 401 and length field 403, respectively. However, the type field 501 may be set to a value to indicate that the option is a Next Hop Address option 500 and the length field 503 may be set to a value to indicate the length of the Next Hop Address option 500, respectively. The length field 503 may be set to a value of three. The Next Hop Address option 500 may further comprise a Next Hop Address field 521, which may be sixteen octets in length, may extend from the sixteenth bit position, and may be set to a value to specify an IPv6 address of a next hop node along a route (e.g. next hop router 141, 143, 151, and/or 153).

Figure 6:
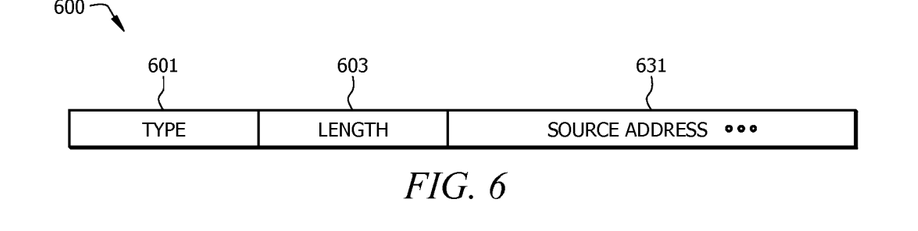
FIG. 6 is a schematic diagram of an embodiment of a Source Address option encoding.

FIG. 6 is a schematic diagram of an embodiment of a Source Address option 600 encoding. The Source Address option 600 may be sent by an ingress router (e.g. ingress router 140 and/or 150) as part of an RA message and may comprise route information such as a source address assigned to a multi-homed host (e.g. host 110) by the ingress router and/or a NE in a network associated with the ingress router (e.g. network 145 and/or 155). The Source Address option 600 may comprise a type field 601 and a length field 603, which may be similar to type field 501 and length field 503, respectively. However, the type field 601 may be set to a value to indicate that the option is a Source Address option 600 and the length field 603 may be set to a value to indicate the length of the Source Address option 600, respectively. The length field 603 may be set to a value of three. The Source Address option 600 may further comprise a Source Address field 631, which may be sixteen octets in length, may extend from the sixteenth bit position, and may be set to a value to specify a source IPv6 address (e.g. of a host 110).

Figure 7:
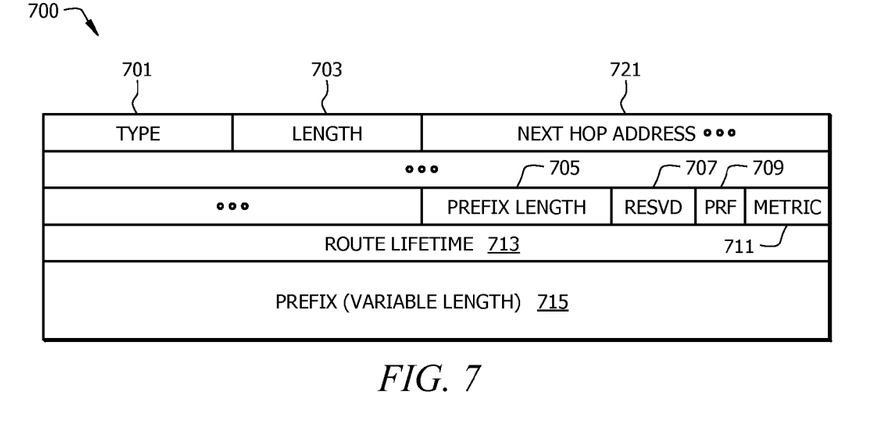
FIG. 7 is a schematic diagram of an embodiment of a Next Hop Address with Route Prefix option encoding.

FIG. 7 is a schematic diagram of an embodiment of a Next Hop Address with Route Prefix option 700 encoding. The Next Hop Address with Route Prefix option 700 may be sent by an ingress router (e.g. ingress router 140 and/or 150) as part of an RA message and may comprise route information such as an IP address for a next hop router (e.g. next hop router 141, 143, 151, and/or 153) and an associated route prefix. The Next Hop Address with Route Prefix option 700 may comprise a type field 701, a length field 703, a Next Hop Address field 721, a Prefix Length field 705, a Reserved field 707, a Prf field 709, a Metric field 711, a Route Lifetime field 713, and a Prefix field 715, which may be substantially similar to type field 501, length field 503, Next Hop Address field 521, Prefix Length field 405, Reserved field 407, Prf field 409, Metric field 411, Route lifetime field 413, and Prefix field 415, respectively. However, the Type field 701 may be set to a value to indicate that the option is a Next Hop Address with Route Prefix option 700 and the length field 703 may be set to a value to indicate the length of the Next Hop Address with Route Prefix option 700, respectively. The Length field 703 may be set to a value of eight octets. For example, the length of a prefix of length sixteen (e.g. sixteen bits set to a value of one in an associated subnet mask) may be may be five octets.

Figure 8:
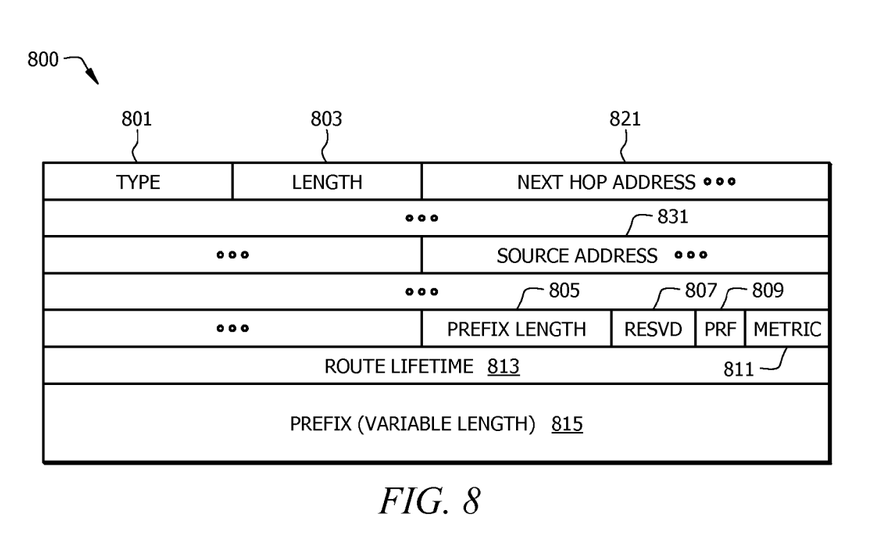
FIG. 8 is a schematic diagram of an embodiment of a Next Hop Address with Source Address and Route Prefix option encoding.

FIG. 8 is a schematic diagram of an embodiment of a Next Hop Address with Source Address and Route Prefix option 800 encoding. The Next Hop Address with Source Address and Route Prefix option 800 may be sent by an ingress router (e.g. ingress router 140 and/or 150) as part of an RA message and may comprise route information such as an IP address for a next hop router (e.g. next hop router 141, 143, 151, and/or 153) an associated route prefix, and an assigned source address (e.g. for a host 110). The Next Hop Address with Source Address and Route Prefix option 800 may comprise a type field 801, a length field 803, a Next Hop Address field 821, a Source Address field 831, a Prefix Length field 805, a Reserved field 807, a Prf field 809, a Metric field 811, a Route Lifetime field 813, and a Prefix field 815, which may be substantially similar to type field 501, length field 503, Next Hop Address field 521, Source Address field 631, Prefix Length field 405, Reserved field 407, Prf field 409, Metric field 411, Route lifetime field 413, and Prefix field 415, respectively. However, the Type field 801 may be set to a value to indicate that the option is a Next Hop Address with Source Address and Route Prefix option 800 and the length field 803 may be set to a value to indicate the length of the Next Hop Address with Source Address and Route Prefix option 800, respectively. The Length field 803 may be set to a value of eight octets. For example, the length of a prefix of length sixteen (e.g. sixteen bits set to a value of one in an associated subnet mask) may be may be five octets.

Figure 9:
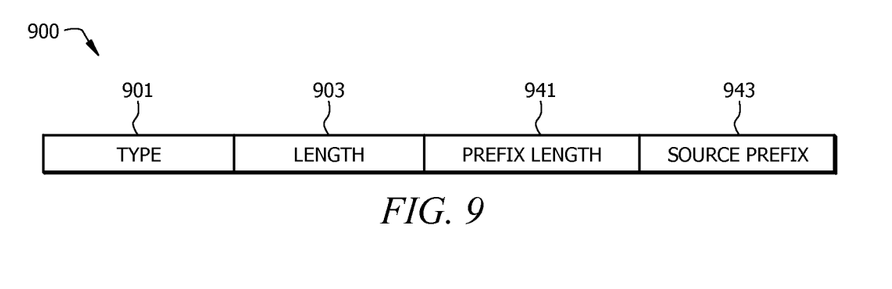
FIG. 9 is a schematic diagram of an embodiment of a Source Prefix option encoding.

FIG. 9 is a schematic diagram of an embodiment of a Source Prefix option 900 encoding. The Source Prefix option 900 may be sent by an ingress router (e.g. ingress router 140 and/or 150) as part of an RA message and may comprise route information such as a source address prefix assigned to a multi-homed host (e.g. host 110) by the ingress router and/or a NE in a network associated with the ingress router (e.g. network 145 and/or 155). The Source Prefix option 900 may comprise a type field 901 and a length field 903, which may be similar to type field 601 and length field 603, respectively. However, the type field 901 may be set to a value to indicate that the option is a Source Prefix option 900 and the length field 903 may be set to a value to indicate the length of the Source Prefix option 900, respectively. The length field 903 may be set to a value of three. The Source Prefix option 900 may further comprise a Prefix Length field 941, which may be eight bits in length, may extend from the sixteenth bit position to the twenty third bit position, may comprise a length of an IPv6 prefix (e.g. the length of a source prefix assigned to the host 110), and may comprise a value ranging from zero to 128. The Source Prefix option 900 may further comprise a Source Prefix field 943, which may be sixteen octets or less in length, may extend from the twenty fourth bit position, and may be set to a value to specify a source IPv6 prefix (e.g. of a host 110).

Figure 10:
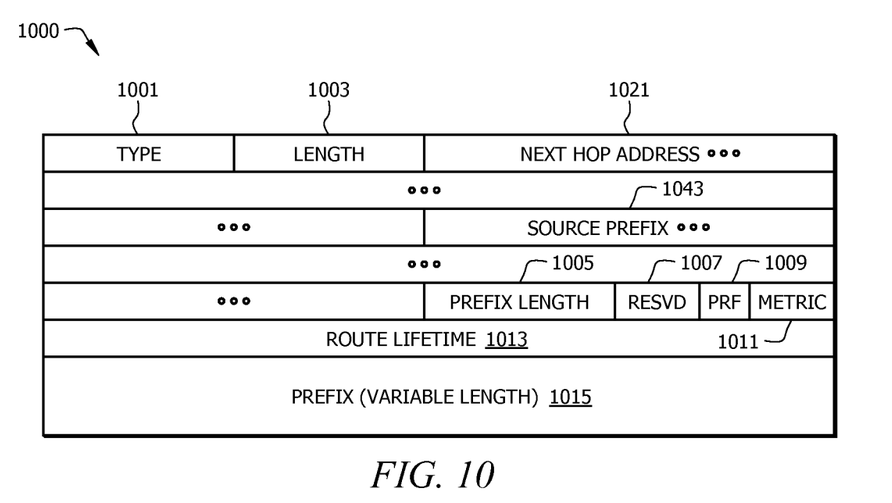
FIG. 10 is a schematic diagram of an embodiment of a Next Hop Address with Source Prefix and Route Prefix option encoding.

FIG. 10 is a schematic diagram of an embodiment of a Next Hop Address with Source Prefix and Route Prefix option 1000 encoding. The Next Hop Address with Source Prefix and Route Prefix option 1000 may be sent by an ingress router (e.g. ingress router 140 and/or 150) as part of an RA message and may comprise route information such as an IP address for a next hop router (e.g. next hop router 141, 143, 151, and/or 153) an associated route prefix, and an assigned source prefix (e.g. for a host 110). The Next Hop Address with Source Prefix and Route Prefix option 1000 may comprise a type field 1001, a length field 1003, a Next Hop Address field 1021, a Prefix Length field 1005, a Reserved field 1007, a Prf field 1009, a Metric field 1011, a Route Lifetime field 1013, and a Prefix field 1015, which may be substantially similar to type field 801, a length field 803, a Next Hop Address field 821, a Prefix Length field 805, a Reserved field 807, a Prf field 809, a Metric field 811, a Route Lifetime field 813, and a Prefix field 815, respectively. However, the Type field 1001 may be set to a value to indicate that the option is a Next Hop Address with Source Prefix and Route Prefix option 1000 and the length field 1003 may be set to a value to indicate the length of the Next Hop Address with Source Prefix and Route Prefix option 1000, respectively. The Length field 803 may be set to a value of eight octets. For example, the length of a prefix of length sixteen (e.g. sixteen bits set to a value of one in an associated subnet mask) may be may be five octets. The Next Hop Address with Source Prefix and Route Prefix option 1000 may further comprise a Source Prefix field 1043, which may be similar to Source Address field 1031, but may comprise a source prefix and/or a source prefix length (e.g. similar to Source Prefix field 943 and/or Prefix Length field 941) instead of a source address.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
 a memory; and
 a processor coupled to the memory and configured to:
  receive a Router Solicitation (RS) from a multi-homed host interested in obtaining route information; and
  send, in response to the RS, the route information to the multi-homed host in a Router Advertisement (RA) message,
 wherein the route information comprises source address information for the multi-homed host,
 wherein the route information is encoded in the RA message in a Next Hop Address with Source Address and Route Prefix option, and
 wherein the Next Hop Address with Source Address and Route Prefix option comprises:
  a Type field that indicates the option is a Next Hop Address with Route Prefix option;

a Length field that indicates a length of the Next Hop Address with Route Prefix option;
a Next Hop Address field that indicates an address of a next hop node;
a Source Address field that indicates a source address for the multi-horned host;
a Prf field that indicates wheater the host should prefer the NE as a default router over other default routers;
a Prefix field that indicates an Internet Protocol version Six (IPv6) destination prefix or IPv6 destination address reachable via the next hop node;
a Metric field that indicates whether the host should prefer he next hop node associated with the e IPv6 destination prefix or IPv6 destination address over other next hops when multiple identical prefixes for different next hops have been received:
a Route Lifetime field that indicates a length of time in seconds that the IPv6destination prefix or IPv6 destination address is valid for route determination; and
a Prefix Length field that indicates a number of leading bits in the Prefix field that comprise the IPv6 destination prefix.

2. The NE of claim 1, wherein the source address comprises an Internet Protocol version Six (IPv6) address.

3. The NE of claim 1, wherein the NE is positioned at an edge of first access network, wherein the NE is configured to provide the multi-homed host access to the first access network, and wherein the multi-homed host is configured to simultaneously access a plurality of access network including the first access network.

4. The NE of claim 3, wherein the address of the next hop node indicated by the RA message is positioned in an intermediate network between the NE and the multi-homed host.

5. The NE of claim 4, wherein the Prefix field comprises information sufficient for the multi-homed host to communicate with the NE via a route traversing the intermediate network across the next hop node.

6. The NE of claim 3, wherein the source address in the RA message is a source address usable by the multi-homed host when accessing the first access network.

7. The NE of claim 6, wherein the NE is configured to performing ingress filtering on messages received from the multi-homed host by dropping messages received from the multi-homed host that do not comprise the source address.

8. A network element (NE) comprising:
a memory; and
a processor coupled to the memory and configured to:
  receive a Router Solicitation (RS) from a multi-homed host interested in obtaining route information; and
  send, in response to the RS, the route information to the multi-homed host in a Router Advertisement (RA) message,
wherein the route information is encoded in the RA message in a Next Hop Address with Source Prefix and Route Prefix option, and
wherein the Next Hop Address with Source Prefix and Route Prefix option comprises:
  a Type field that indicates the option is a Next Hop Address with Source Prefix and Route Prefix option;
  a Length field that indicates a length of the Next Hop Address with Source Prefix and Route Prefix option;
  a Next Hop Address field that indicates an address of a next hop node;
  a Source Prefix field that indicates an Internet Protocol version Six (IPv6) source prefix for the multi-homed host;
  a Prf field that indicates whether the host should prefer the NE as a default router over other default routers:,
  a Prefix field that indicates an IPv6 destination prefix or IPv6 destination address reachable via the next hop node;
  a Metric field that indicates whether the host should prefer the next hop associated with the IPv6 destination prefix or IPv6 destination address over other next hops when multiple identical prefixes for different next hops have been received;
  a Route Lifetime field that indicates a length of time in seconds that the IPv6 destination prefix or IPv6 destination address is valid for route determination; and
  a Prefix Length field that indicates a number of leading bits in the Prefix field that comprise the IPv6 destination prefix.

9. The NE of claim 8, wherein the address of the next hop node comprises an Internet Protocol version Six (IPv6) address.

10. The NE of claim 8, wherein the NE is positioned at an edge of a first access network, wherein the NE is configured to provide the multi-homed host access to the first access network, and wherein the multi-homed host is configured to simultaneously access a plurality of access networks including the first access network.

11. The NE of claim 10, wherein the address of the next hop node indicated by the RA message is positioned in an intermediate network between the NE and the multi-homed host.

12. The NE of claim 11, wherein the Prefix field comprises information sufficient for the multi-homed host to communicate with the NE via a route traversing the intermediate network across the next hop node.

13. The NE of claim 10, wherein the source prefix in the RA message provides information sufficient for the multi-homed host to determine a source address usable by the multi-homed host when accessing the first access network.

14. The NE of claim 13, wherein the NE is configured to performing ingress filtering on messages received from the multi-homed host by dropping messages received from the multi-homed host that do not comprise the source prefix.

15. A method comprising:
configuring a multi-homed host with at least one source address derived from an Internet Protocol (IP) address prefix supported by a destination network by transmitting, via a transmitter of a network element (NE), a Router Advertisement (RA) message comprising the source address to the multi-homed host; and
performing by a processor of the NE ingress filtering on messages received from the multi-homed host,
wherein ingress filtering comprises dropping messages received via a receiver of the NE from the multi-homed host when the messages do not comprise any source addresses derived from any prefixes supported by the destination network,
wherein the RA message comprises route information encoded in a Next Hop Address with Source Prefix and Route Prefix option, and
wherein the Next Hop Address with Source Prefix and Route Prefix option comprises:
  a Type field that indicates the option is the Next Hop Address with Source Prefix and Route Prefix option;
  a Length field that indicates a length of the Next Hop Address with Source Prefix and Route Prefix option;
  a Next Hop Address field that indicates an address of a next hop node;

a Source Prefix field that indicates an Internet Protocol version Six (IPv6) source prefix for the multi-homed host to employ to determine the at least one source address;
a Prf field that indicates whether the host should prefer the NE as a default router over other default routers;
a Prefix field that indicates an IPv6 destination prefix or IPv6 destination address reachable via the next hop node;
a Metric field that indicates whether the host should prefer the next hop associated with e IPv6 destination prefix or IPv6 destination address over other next hops when multiple identical prefixes for different next hops have been received;
a Route Lifetime field that indicates a length of time in seconds that the IPv6destination prefix or IPv6 destination address is valid for route determination; and
a Prefix Length field that indicates a number of leading bits in the Prefix field that comprise the IPv6 destination prefix.

16. The method of claim 15, wherein the NE is positioned at the edge of a first access network, wherein the NE is configured to provide the multi-homed host access to the first access network, and wherein the multi-homed host is configured to simultaneously access a plurality of access networks including the first access network.

17. The method of claim 15, wherein the address of the next hop node indicated by the RA message is positioned in an intermediate network between the NE and the multi-homed host.

18. The method of claim 15, wherein the Prefix field comprises information sufficient for the multi-homed host to communicate with the NE via a route traversing an intermediate network across the next hop node.

19. The method of claim 15, wherein the source prefix in the RA message provides information sufficient for the multi-homed host to determine a source address usable by the multi-homed host when accessing the first access network.

* * * * *